(12) United States Patent
Rasool et al.

(10) Patent No.: US 10,399,041 B2
(45) Date of Patent: Sep. 3, 2019

(54) TWO-DIMENSIONAL METAL CARBIDE ANTIMICROBIAL MEMBRANE AND ANTIMICROBIAL AGENT

(71) Applicant: QATAR FOUNDATION FOR EDUCATION, SCIENCE AND COMMUNITY DEVELOPMENT, Washington, DC (US)

(72) Inventors: Kashif Rasool, Doha (QA); Khaled Ahmed Mahmoud, Doha (QA)

(73) Assignee: Qatar Foundation for Education, Science and Community Development, Doha (QA)

( * ) Notice: Subject to any disclaimer, the term of this patent is extended or adjusted under 35 U.S.C. 154(b) by 0 days.

(21) Appl. No.: 15/769,632

(22) PCT Filed: Oct. 14, 2016

(86) PCT No.: PCT/US2016/057029
§ 371 (c)(1),
(2) Date: Aug. 31, 2018

(87) PCT Pub. No.: WO2017/083055
PCT Pub. Date: May 18, 2017

(65) Prior Publication Data
US 2018/0304208 A1 Oct. 25, 2018

Related U.S. Application Data

(63) Continuation-in-part of application No. PCT/US2015/061135, filed on Nov. 17, 2015.
(Continued)

(51) Int. Cl.
*B01D 63/08* (2006.01)
*C02F 1/44* (2006.01)
(Continued)

(52) U.S. Cl.
CPC .......... *B01D 71/021* (2013.01); *B01D 63/08* (2013.01); *B01D 67/0088* (2013.01);
(Continued)

(58) Field of Classification Search
CPC ... C01B 32/90; C01B 32/921; C01B 21/0615; C01B 32/914; C01P 2002/85; C02F 1/44;
(Continued)

(56) References Cited

U.S. PATENT DOCUMENTS 5,490,938 A * 2/1996 Sawan ................... A01N 25/24
210/321.84
9,193,595 B2 * 11/2015 Barsoum ................. C01B 21/06
(Continued)

FOREIGN PATENT DOCUMENTS

EP  154132 * 9/2005 ............. A01N 59/16
JP  8-109497 A  4/1996
(Continued)

OTHER PUBLICATIONS

Hu, Wenbing et al., "Graphene-based antibacterial paper", ACS Nano (2010), vol. 4, No. 7, pp. 4317-4323.
(Continued)

*Primary Examiner* — Ana M Fortuna
(74) *Attorney, Agent, or Firm* — Richard C. Litman

(57) ABSTRACT

The antimicrobial agent includes at least one two-dimensional metal carbide layer. The two-dimensional metal carbide has the formula $Ti_{n+1}C_nT_x$, where T represents a terminal functional group and x represents the number of terminal functional groups. The two-dimensional metal carbide is preferably $Ti_3C_2T_x$. The terminating group may be oxygen, hydroxide (OH), fluorine or combinations thereof. The antimicrobial agent may be used as a two-dimensional metal carbide antimicrobial membrane (10) or filter for removal of harmful bacteria, such as *E. coli* and *B. subtilis*.
(Continued)

A stack of two-dimensional metal carbide layers (14) may be supported on a polymer filter substrate (12), such as a polyvinylidene fluoride (PVDF) supporting substrate.

9 Claims, 18 Drawing Sheets

Related U.S. Application Data

(60) Provisional application No. 62/244,432, filed on Oct. 21, 2015, provisional application No. 62/080,967, filed on Nov. 17, 2014.

(51) Int. Cl.
| | |
|---|---|
| *B01D 67/00* | (2006.01) |
| *B01D 69/02* | (2006.01) |
| *B01D 71/02* | (2006.01) |
| *B01D 71/34* | (2006.01) |
| *C02F 1/50* | (2006.01) |
| *B82Y 30/00* | (2011.01) |
| *B01D 65/08* | (2006.01) |

(52) U.S. Cl.
CPC ........... *B01D 69/02* (2013.01); *B01D 71/022* (2013.01); *B01D 71/34* (2013.01); *C02F 1/44* (2013.01); *C02F 1/50* (2013.01); *B01D 65/08* (2013.01); *B01D 2323/10* (2013.01); *B01D 2323/46* (2013.01); *B01D 2325/48* (2013.01); *B82Y 30/00* (2013.01); *C02F 2303/20* (2013.01); *C02F 2305/08* (2013.01)

(58) Field of Classification Search
CPC .. C02F 2103/08; C02F 2101/10; B82Y 30/00; B01D 67/0079; B01D 71/02
See application file for complete search history.

(56) References Cited

U.S. PATENT DOCUMENTS

| | | | |
|---|---|---|---|
| 10,058,542 B1 * | 8/2018 | Holmgren | A61K 31/444 |
| 2009/0138077 A1 | 5/2009 | Weber et al. | |
| 2013/0252021 A1 | 9/2013 | Neumann et al. | |
| 2014/0162130 A1 * | 6/2014 | Barsoum | C01B 21/06 |
| | | | 429/231.8 |
| 2017/0088429 A1 * | 3/2017 | Shin | C01B 32/921 |
| 2018/0108910 A1 * | 4/2018 | Barsoum | H01M 4/58 |
| 2018/0169591 A1 * | 6/2018 | Mahmoud | B01D 69/12 |
| 2018/0179070 A1 * | 6/2018 | Zhang | B82Y 30/00 |

FOREIGN PATENT DOCUMENTS

| | | |
|---|---|---|
| JP | 10-219513 A | 8/1998 |
| JP | 11-171715 A | 6/1999 |

OTHER PUBLICATIONS

Naguib, Michael et al., "25th Anniversary Article: MXenes: A new family of two-dimensional materials", Advanced Materials (2013), vol. 26, pp. 992-1005.

Yang, Xi et al., "Antibacterial activity of two-dimensional MoS2 sheets", Nanoscale (2014)vol. 6, pp. 10126-10133.

Rasool, Kashif et al., "Antibacterial Activity of Ti3C2Tx MXene", ACS Nano (2016), vol. 10, pp. 3674-3684.

* cited by examiner

TWO-DIMENSIONAL METAL CARBIDE ANTIMICROBIAL MEMBRANE AND ANTIMICROBIAL AGENT

TECHNICAL FIELD

The present invention relates to the antimicrobial properties of two-dimensional metal carbides, and particularly to a two-dimensional metal carbide antimicrobial membrane and an antimicrobial agent that include a membrane or agent formed from one or more layers of a two-dimensional metal carbide, particularly the MXene $Ti_3C_2T_x$, where T represents a terminating functional group (O, OH and/or F) and x represents the number of terminating groups.

BACKGROUND ART

Biofouling is a major challenge in the membrane separation industry. Bacteria and other microorganisms adhere to the membrane surface and form a viscous gel-like biofilm, causing a severe decline in the flux. Biofouling of membranes in wastewater treatment and water purification facilities decreases operational efficiency and may result in down time for cleaning or replacing the membranes. Thus, there is great interest in membranes and coatings for membranes that exhibit antimicrobial activity, as well as antibacterial agents that can be used to treat water to reduce populations of bacteria that may cause biofouling.

Although there are some materials known to exhibit some antibacterial properties, there is a need for improved antimicrobial filtering and coating materials that are less subject to biofouling. Thus, a two-dimensional metal carbide antimicrobial membrane and antimicrobial agent solving the aforementioned problems is desired.

DISCLOSURE OF INVENTION

The two-dimensional metal carbide antimicrobial agent includes at least one layer of MXenes. MXenes include atomically thin, two-dimensional (2D) transition metal carbides and carbonitrides. Preferably, the two-dimensional metal carbide has the formula $Ti_3C_2T_x$, where T represents a terminating or terminal functional group, and x represents a number of the terminating functional groups. The terminating group may be oxygen, hydroxide (OH), fluorine or combinations thereof.

At least one of the two-dimensional metal carbide layers may be supported on a polymer substrate, including, but not limited to, polyethersulfone (PES), polypropylene (PP), cellulose acetate (CA) or polyvinylidene fluoride (PVDF), to form an antimicrobial membrane filter for removal of harmful gram negative (G−) and gram positive (G−) bacteria, such as E. coli and B. subtilis, from water. Further, by contacting or coating a substrate with an effective amount of the two-dimensional metal carbide, the MXene metal carbide may be used as an agent for controlling biofilm formation on the substrate.

These and other features of the present invention will become readily apparent upon further review of the following specification and drawings.

BRIEF DESCRIPTION OF THE DRAWINGS

Similar reference characters denote corresponding features consistently throughout the attached drawings.

BEST MODES FOR CARRYING OUT THE INVENTION

Figure 1A:
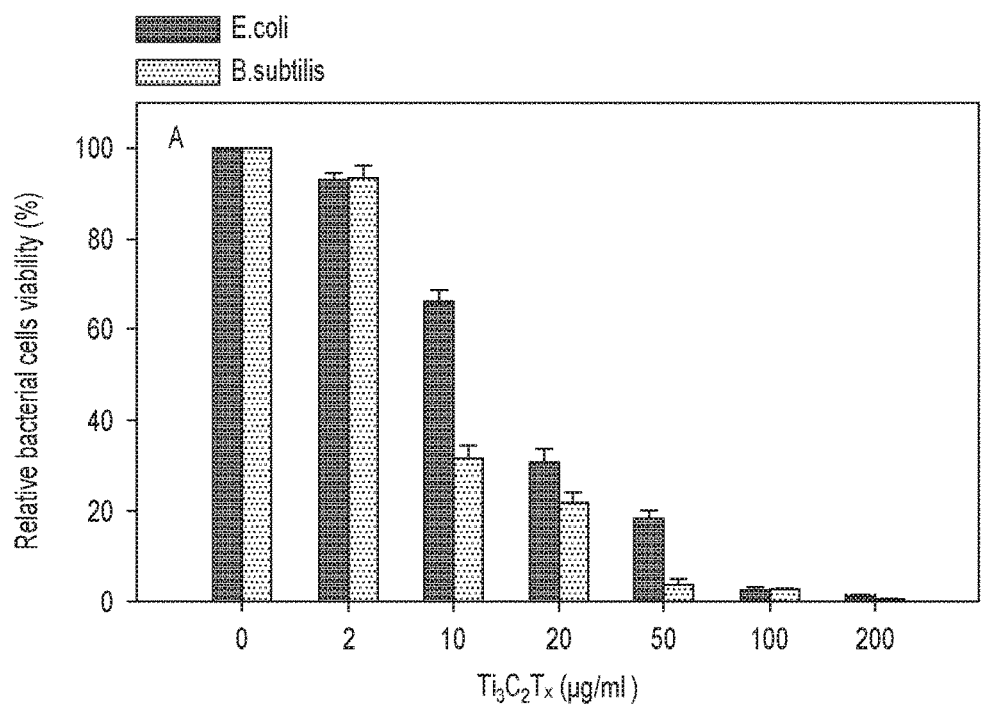
FIG. 1A is a graph showing cell viability measurements of E. coli and B. subtilis bacteria treated with $Ti_3C_2T_x$, in water for 4 hours as a function of concentration.

The two-dimensional metal carbide antimicrobial membrane and antimicrobial agent includes an antimicrobial agent that has at least one two-dimensional metal carbide layer. The two-dimensional metal carbide layer has a two-dimensional transition metal carbide, such as MXene. Preferably, the MXene has the formula $Ti_3C_2T_x$, where T represents a terminating or terminal functional group (O, OH and/or F) and x represents the number of terminating groups.

Both $Ti_3C_2T_x$ in aqueous suspension and a $Ti_3C_2T_x$ coated membrane have exhibited biocidal effects against both gram-negative *E. coli* and gram-positive *B. Subtilis* bacteria in water. The antimicrobial agent may be coated on or incorporated into membranes used in water treatment, coatings for surgical materials, and/or paint for biomedical devices.

Transition metal carbides called MXenes are a new family of 2D materials. "MXenes" denote the loss of the A element from the MAX phases and have 2D structure. A MAX-phase composition typically has the empirical formula $M_{n+1}AX_n$, where M is an early transition metal; A is an element selected from Al, Si, P, S, Ga, Ge, As, Cd, In, Sn, Tl, and Pb; X is either C or N; and n is 1, 2, or 3. An MXene may be formed by removing the A element from the MAX-phase composition, leaving a two-dimensional crystal array wherein each X is positioned within an octahedral array of M. Thus, the MXene has the formula $M_{n+1}X_n$, where M is an early transition metal; X is either C or N; and n is 1, 2, or 3. In contrast to other layered materials, such as graphene, where weak Van der Waals interactions hold the structure together, the bonds between the layers in the MAX phases are too strong to be broken by shear or other mechanical means. Chemical etching with subsequent intercalation and sonication is required to produce a colloidal solution of MXene flakes. The edges of the two-dimensional MXene layer usually do not terminate in an M, but with an oxide or fluoride, giving the formula $M_{n+1}X_nT_x$, where x is the number of terminal groups.

In order to prepare $Ti_3C_2T_x$ in suspension form, the present inventors obtained flakes of $Ti_3C_2T_x$ (with a few layers or in single layers) by delaminating a multilayer (ML)-$Ti_3C_2T_x$ powder by ultrasonication after etching $Ti_3AlC_2$ (MAX) with NaF/HCl solution. The resultant (ML)-$Ti_3C_2T_x$ powder was dispersed in de-aerated water with a weight ratio of (ML)-$Ti_3C_2T_x$ powder:water of 250:1. The suspension was sonicated under flowing argon, and then centrifuged for one hour at 3,000 rpm to obtain a supernatant containing $Ti_3C_2T_x$ flakes. Transmission electron microscopy (TEM), scanning electron microscopy (SEM), energy dispersive X-ray spectroscopy (EDX), and X-ray diffraction (XRD) were each used to confirm the morphology of the flakes. The structural morphology of the delaminated MXene sheets included a thin, transparent and smooth film with small wrinkles. Fluorine and oxygen were observed in energy-dispersive spectroscopy.

A two-dimensional metal carbide antimicrobial membrane, i.e., a $Ti_3C_2T_x$, membrane, was fabricated by a vacuum-assisted filtration method, where colloidal solutions of delaminated $Ti_3C_2T_x$, were filtered to obtain membranes with controllable mass-loadings and thicknesses. The delaminated $Ti_3C_2T_x$, solution was diluted to 0.01 mg/ml. The dilute colloidal solution contained single-layer $Ti_3C_2T_x$, sheets with thicknesses on the order of 1 nm and lateral sizes on the order of hundreds of nanometers to several microns. The high aspect ratio of the nanosheets ensures uniform and narrow two-dimensional (2D) nanochannels and mitigates the presence of meso- and macro-pores across the membrane.

Figure 4:
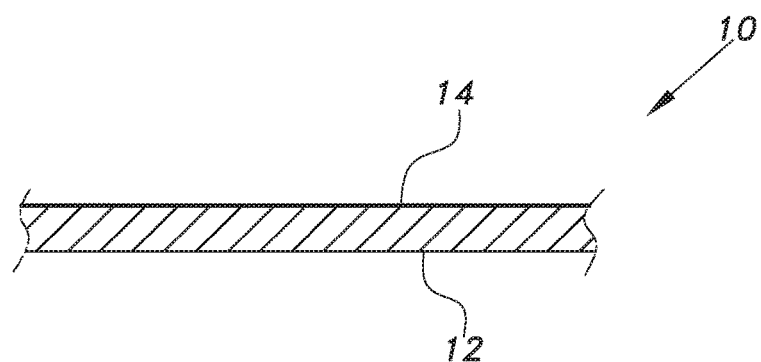
FIG. 4 is a partial side view in section of a two-dimensional metal carbide antimicrobial membrane according to the present invention.

Vacuum-assisted filtration (VAF) was used to filter 500 mL of the diluted solutions through a commercial polyvinylidene fluoride (PVDF) membrane (hydrophilic, 0.45 μm pore size, EMD Millipore Durapore, US) with a diameter of 47 mm. As shown in FIG. 4, the two-dimensional metal carbide antimicrobial membrane 10 can be formed as a thin film layer 14 of $Ti_3C_2T_x$, formed on a PVDF filter substrate/membrane 12.

A glass microfiltration apparatus, with a fritted alumina supported base, was used for the vacuum filtration. The filtered membrane was air dried and retained on the PVDF support. The hydrophilicity of the membrane was evaluated by measuring the water contact angle of pristine PVDF membranes and the water contact angle after coating with $Ti_3C_2T_x$, film. The PVDF was relatively hydrophobic with a contact angle of 81°. On the other hand, the $Ti_3C_2T_x$ coated membrane functionalization significantly increased the hydrophilicity of the membrane, decreasing the water contact angle to 38°.

The delaminated $Ti_3C_2T_x$, sheets formed thin, transparent and smooth films with small wrinkles. Fluorine and oxygen were observed using energy-dispersive spectroscopy (EDS), suggesting O- and F-containing surface terminations. XRD was performed on both air-dried $Ti_3AlC_2$ and $Ti_3C_2T_x$ powders, and typical (0001) peaks from $Ti_3AlC_2$ were observed. Specifically, only peaks corresponding to basal-plane oriented $Ti_3AlC_2$ with a c lattice parameter of 18.6 Å were found. However, $Ti_3C_2T_x$ showed a shift to lower angles of the (0001) peaks and a large increase of c lattice value to 27-28 Å. These large shifts are suggestive of the presence of water, and possibly cations, between the hydrophilic and negatively charged $Ti_3C_2T_x$ sheets.

As will be described in greater detail below, the antibacterial properties of $Ti_3C_2T_x$ and $Ti_3C_2T_x$ membranes were evaluated using *E. coli* and *B. subtilis* as the model gram negative and gram positive bacteria, respectively. Glycerol stocks were used to inoculate defined overnight cultures in a Luria-Bertani broth (LB) medium at 35° C. Following this, 1 mL aliquots of cell suspensions were subcultured and harvested at the exponential growth phase. Cultures were centrifuged at 5,000 rpm for five minutes, and the resultant pellets were washed three times with saline buffer (pH 7.2) to remove residual macromolecules and other growth medium constituents. The cell pellets collected by centrifugation were re-suspended in sterilized deionized water (DW) and diluted to a cell concentration of approximately $10^8$ colony forming units (CFU)/ml.

The antibacterial activity of each strain was determined by the measurement of optical density (OD) and the colony count method. Batch assays were performed with different $Ti_3C_2T_x$ concentrations in 1.5 mL tubes containing 500 µL of reaction mixture. In order to examine the effect of $Ti_3C_2T_x$ concentration on bacterial growth, the batch assays were subjected to 2, 10, 20, 50, 100 and 200 µg of $Ti_3C_2T_x$/mL, respectively. The reactors were exposed to continuous shaking at 150 rpm and a constant mesophilic temperature of 35° C. for four hours. For controls, DW was added instead of $Ti_3C_2T_x$. The reaction mixture was then transferred to 15 mL tubes, each containing 10 mL of LB medium, and the tubes were inoculated on a shaking incubator at 150 rpm at 35° C. Aliquots of the samples were withdrawn at specific time intervals and the value of optical density (OD) at a wavelength of 600 nm was measured on an ultraviolet-visible light (UV-VIS) spectrometer. Bacterial growth curves were created by plotting OD values versus time, and bacterial growth kinetics were studied. All experiments were performed as duplicates and average values were reported.

A second set of experiments was performed for antibacterial activity. The bacteria (about $10^8$ CFU/mL, where CFU=colony forming units) were incubated with different concentrations of $Ti_3C_2T_x$ for four hours. Aliquots of the samples were withdrawn, and the CFU were counted by plating 40 µL of $10^6$ dilutions of the bacterial suspensions onto LB agar plates. Colonies were counted after incubation at 35° C. and the cell survival rate was expressed as the percentage of the control. The following equation was used to represent cells' relative viability:

$$\text{Relative cells vaibility} = \left(\frac{N_c}{N_m}\right) \times 100,$$

where $N_c$ is the number of bacterial colonies of the control sample and $N_m$ is the number of colonies of cells treated with $Ti_3C_2T_x$. The antibacterial effect of $Ti_3C_2T_x$ was compared with that of graphene oxide (GO), which was supplied as stock suspensions of 2 mg/ml. $Ti_3C_2T_x$ concentrations of 100 µg/mL were applied to both *E. coli* and *B. subtilis* and cell survival rates were counted by CFU/mL, as described above. The GO used for comparison in the experiments was synthesized by oxidizing natural graphite powders using $H_2SO_4$ and $KMnO_4$ according to the modified Hummers method.

For testing the antibacterial activity of $Ti_3C_2T_x$ and GO membranes, bacterial cells were diluted to $10^5$ CFU/mL in sterilized DW, and 40 µL of suspensions were pipetted and spread onto a nutritive agar plate, followed by air drying for five minutes. The $Ti_3C_2T_x$ and GO membranes were placed on the surfaces of agar plates and incubated at 35° C. for 12 hours. Finally, the growths of the colonies on the membrane surface were observed. The membrane samples were sterilized with ultraviolet (UV) radiation for 30 minutes before the experiments.

Figure 1B:
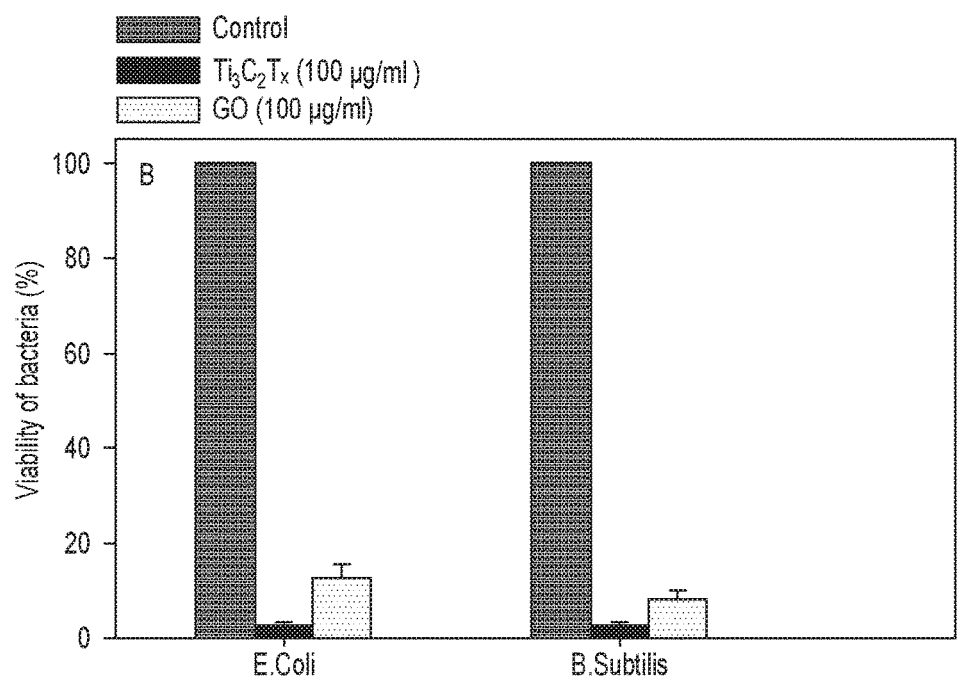
FIG. 1B is a graph comparing cell viability measurements of the E. coli and B. subtilis bacteria after incubation with 100 µg/mL of $Ti_3C_2T_x$, and 100 µg/mL of graphene oxide, respectively.

The antibacterial activity of $Ti_3C_2T_x$ toward selected bacteria strains was investigated by measuring the growth and the cell viability after the contact of the bacteria with increasing concentrations of $Ti_3C_2T_x$ suspensions. The pristine bacteria and bacteria treated with $Ti_3C_2T_x$ were cultivated in LB medium, and the value of optical density (OD) at 600 nm (OD600) was monitored by UV-Vis spectrometer over different time intervals from lag to stationary phases. FIG. 1A is a graph showing cell viability measurements of *E. coli* and *B. subtilis* bacteria treated with $Ti_3C_2T_x$ for four hours in water as a function of $Ti_3C_2T_x$ concentration, with $Ti_3C_2T_x$ concentrations ranging between 0 and 200 µg/ml. Here, the survival rates were obtained by the colony forming count method. FIG. 1B is a graph showing cell viability measurements of the *E. coli* and *B. subtilis* bacteria after incubation with 100 µg/mL of $Ti_3C_2T_x$, as compared to incubation with 100 µg/mL of a graphene oxide (GO). Control for both *E. coli* and *B. subtilis* bacteria was taken to be 100%. It can be seen that $Ti_3C_2T_x$ shows excellent antimicrobial activity for both gram (+) and gram (−) bacteria. The agar plate growth indicated that the bacterial cell loss gradually ascended with increasing concentrations of $Ti_3C_2T_x$. The *E. coli* and *B. subtilis* showed 92.53% and 93.96% survival rates, respectively, at the lowest $Ti_3C_2T_x$ concentration of 2 µg/ml. By increasing the $Ti_3C_2T_x$ concentration from 2 µg/mL to 20 µg/mL, the survival rates of *E. coli* and *B. subtilis* were decreased to 35.31% and 15.21%, respectively, as shown by the consecutively decreasing number of colonies grown on the LB plates. More than 99% bacterial viability loss was observed at the highest $Ti_3C_2T_x$ concentration of 200 µg/ml.

Two-dimensional transition metal carbides have graphene-like morphology. In order to compare antibacterial activity of $Ti_3C_2T_x$ with GO, both bacterial strains were treated with 100 µg/ml of GO under similar experimental conditions as that of the $Ti_3C_2T_x$. FIG. 1B shows the comparison between *E. coli* and *B. subtilis* bacterial colonies exposed to 100 µg/mL of $Ti_3C_2T_x$ or GO, respectively, against a control take to be 100% for both *E. coli* and *B. subtilis* bacteria. For both bacterial strains, there was a substantial difference in bacteria colonies on the agar, significantly indicating that the $Ti_3C_2T_x$, has higher antibacterial activity when compared against GO. $Ti_3C_2T_x$, showed more than 98% cell death to both bacterial strains at 100 µg/mL concentrations of $Ti_3C_2T_x$, whereas GO induced about 90% at the same concentration. In FIGS. 1A and 1B, the error bars represent the standard deviation.

SEM was performed to observe the effect of $Ti_3C_2T_x$, on morphology and surface structure of the bacterial cells. SEM imaging of samples was accomplished as follows. After the antibacterial studies, cells from the treated samples and on the membrane surfaces were fixed with 2.5% glutaraldehyde overnight at 4° C., followed by washing with 0.1 M phosphate buffer (pH 7.4) and dehydration with a graded ethanol series (25, 50, 80, 100%). Samples were allowed to dry completely at room temperature and were then coated with gold by sputtering. Using SEM, the bacterial cells in the absence of $Ti_3C_2T_x$ presented as viable and intact rod-shape bacteria and showed relatively smooth cellular membranes. Following cell exposure to 10 µg/mL of $Ti_3C_2T_x$, the morphology of a significant fraction of *E. coli* cells exhibited cell surface damage. As the $Ti_3C_2T_x$ concentration increased to 50 µg/mL, the morphology of a large fraction of both strains was significantly damaged, and these cells were characterized by noticeable holes or wrinkles on their surfaces. This suggests that with an increase in $Ti_3C_2T_x$ concentration, both *E. coli* and *B. subtilis* are trapped or wrapped by the thin sheets of $Ti_3C_2T_x$ and subsequently form agglomerates. After exposure to 200 mg/mL of $Ti_3C_2T_x$, the bacteria cells became highly deformed and collapsed, with some of the bacteria presenting as being burst, as indicated by scattered cellular debris.

Figure 2A:
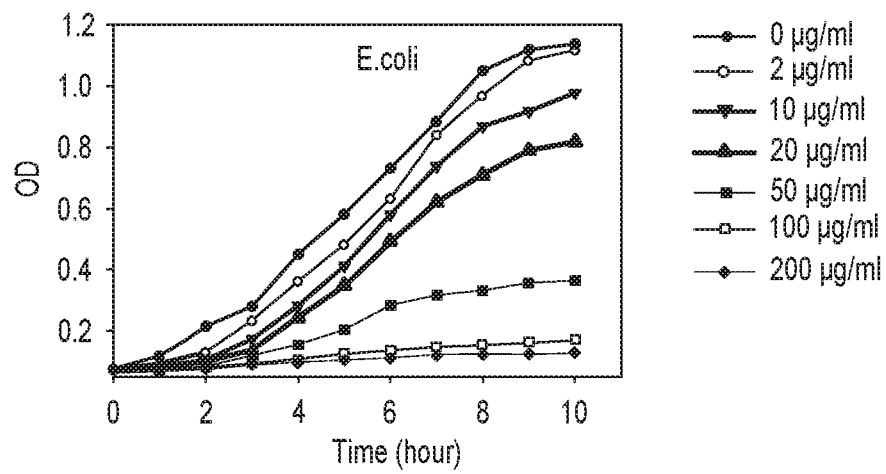
FIG. 2A is an optical density growth curve of E. coli bacteria in Luria-Bertani broth (LB) medium at 35° C. following treatment of the bacterial cells with different concentrations of $Ti_3C_2T_x$ in water for four hours.
Figure 2B:
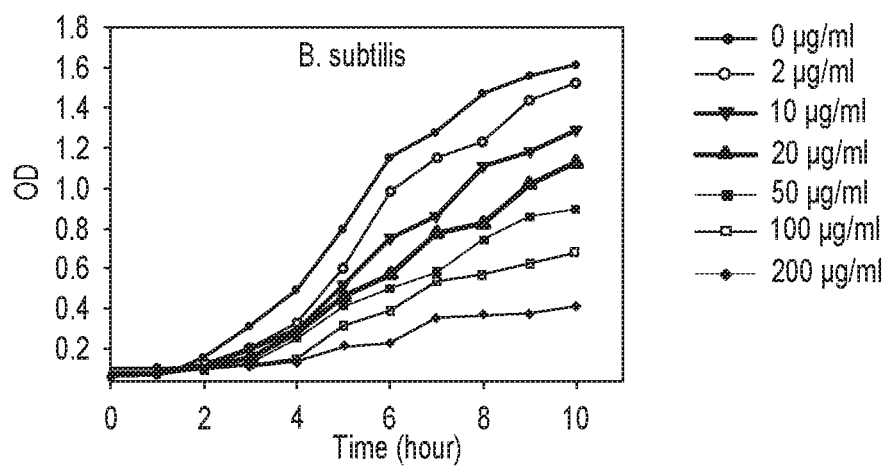
FIG. 2B is an optical density growth curve of B. subtilis bacteria in Luria-Bertani broth (LB) medium at 35° C. following treatment of the bacterial cells with different concentrations of $Ti_3C_2T_x$ in water for four hours.

To further evaluate the antibacterial effects of $Ti_3C_2T_x$, OD growth curves (after treatment of the cells with the $Ti_3C_2T_x$) were studied. FIG. 2A is an optical density growth curve of *E. coli* bacteria in Luria-Bertani broth (LB) medium at 35° C., following treatment of the bacterial cells with differing concentrations of $Ti_3C_2T_x$ in water for four hours. Similarly, FIG. 2B is an optical density growth curve of *B. subtilis* bacteria in Luria-Bertani broth (LB) medium at 35° C., following treatment of the bacterial cells with differing concentrations of $Ti_3C_2T_x$ in water for four hours. Here, control samples were the respective bacteria untreated with $Ti_3C_2T_x$.

It can be seen that for both bacterial strains, growth inhibition is dose dependent and bactericidal activity increases with increasing $Ti_3C_2T_x$ concentration, as is expected from the number of colonies grown on the LB plates. Growth kinetics constants and doubling time for both bacterial strains were evaluated and are shown below in Table 1. The specific growth constant for *E. coli* ($\mu_e$) decreased from 0.277 $h^{-1}$ to 0.068 $h^{-1}$ with increasing $Ti_3C_2T_x$ concentration from 0 to 200 µg/ml. For *B. subtilis*, a decrease in the growth rate constants ($\mu_b$) from 0.347 $h^{-1}$ to 0.134 $h^{-1}$ was observed with increasing $Ti_3C_2T_x$, concentration. Additionally, by increasing the $Ti_3C_2T_x$, concentration from 0 to 200 µg/mL, bacterial doubling time ($T_d$) was increased from 2.496 h to 10.114 h and 1.996 h to 5.158 h for *E. coli* and *B. subtilis*, respectively, showing a strong bactericidal effect.

TABLE 1

Growth constants and doubling times of bacteria treated at different $Ti_3C_2T_x$ concentrations

| Substrate | Constant | $Ti_3C_2T_x$ (µg/mL) | | | | | | |
|---|---|---|---|---|---|---|---|---|
| | | 0 | 2 | 10 | 20 | 50 | 100 | 200 |
| *E. coli* | $\mu_e$ ($h^{-1}$) | 0.277 | 0.271 | 0.261 | 0.239 | 0.168 | 0.087 | 0.068 |
| | $T_d$ (h) | 2.496 | 2.550 | 2.654 | 2.897 | 4.124 | 7.917 | 10.114 |
| *B. subtilis* | $\mu_b$ ($h^{-1}$) | 0.347 | 0.319 | 0.306 | 0.264 | 0.240 | 0.190 | 0.134 |
| | $T_d$ (h) | 1.996 | 2.251 | 2.259 | 2.617 | 2.878 | 3.629 | 5.158 |

In order to investigate the successful fabrication of antimicrobial $Ti_3C_2T_x$, membrane filters and to understand the interaction of the membrane surface with bacteria, the surface morphologies of uncoated and coated PVDF membrane filters, before and after exposure to bacteria, were examined using SEM. The viability and potential regrowth of bacteria retained on the membrane surface was further evaluated by the agar assay to assess the inactivation of *E. coli* and *B. subtilis*.

Figure 5:
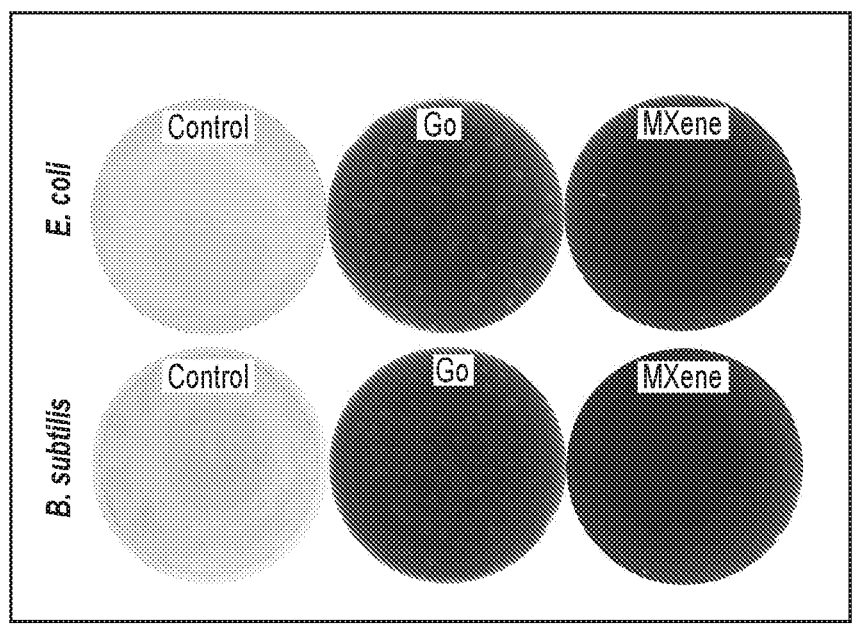
FIG. 5 is a photograph showing a comparison of both E. coli and B. subtilis grown on uncoated PVDF (control) membrane filters, PVDF membrane filters coated with graphene oxide (GO), and $Ti_3C_2T_x$ (MXene)-coated membranes incubated on agar plates.

FIG. 5 shows a comparison of both *E. coli* and *B. subtilis* grown on uncoated PVDF (control) membrane filters, PVDF membrane filters coated with graphene oxide (GO), and two-dimensional metal carbide antimicrobial membranes coated with MXene (specifically, $Ti_3C_2T_x$), incubated on agar plates. After 24 hours of incubation at 35° C., the control membranes were covered by dense *E. coli* and *B. subtilis* bacterial colonies. By contrast, as can be seen in FIG. 5, only a limited number of bacterial colonies were found on the $Ti_3C_2T_x$ MXene and GO membranes. However, fewer colonies were found on the $Ti_3C_2T_x$ membranes compared to the GO membranes, thus showing the superior antibacterial effect of $Ti_3C_2T_x$.

Figure 6A:
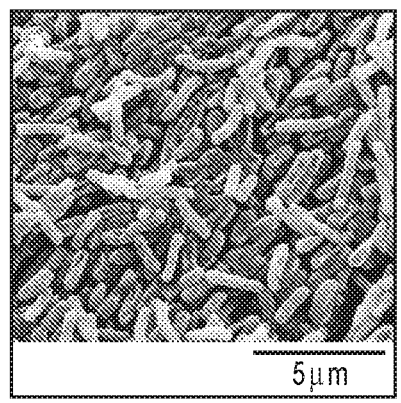
FIG. 6A shows a scanning electron microscope (SEM) photomicrograph of E. coli bacterial colonies grown on the uncoated PVDF (control) membrane filter.
Figure 6B:
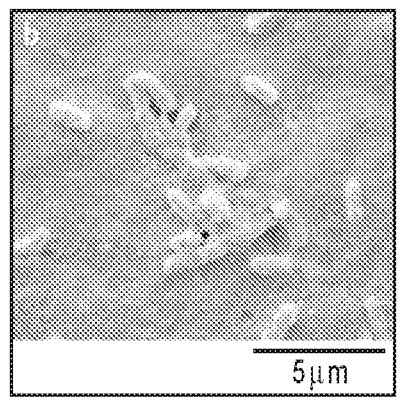
FIG. 6B shows a scanning electron microscope (SEM) photomicrograph of E. coli bacterial colonies grown on the $Ti_3C_2T_x$ (MXene)-coated membrane.
Figure 7A:
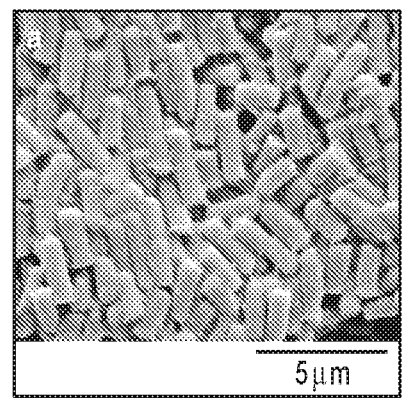
FIG. 7A shows a scanning electron microscope (SEM) photomicrograph of B. subtilis bacterial colonies grown on the uncoated PVDF (control) membrane filter.
Figure 7B:
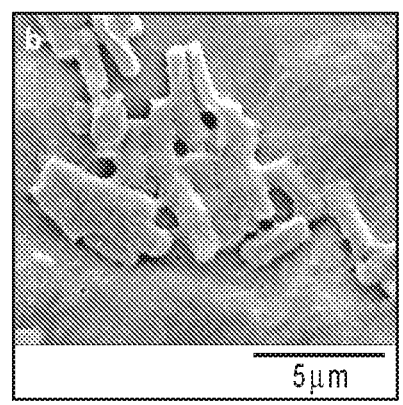
FIG. 7B shows a scanning electron microscope (SEM) photomicrograph of B. subtilis bacterial colonies grown on the $Ti_3C_2T_x$, (MXene)-coated membranes.

Additionally, FIG. 6A shows a scanning electron microscope (SEM) image of *E. coli* bacterial colonies grown on the uncoated PVDF (control) membrane filter, which is compared against FIG. 6B, which shows a scanning electron microscope (SEM) image of *E. coli* bacterial colonies grown on the MXene ($Ti_3C_2T_x$) coated membrane. Similarly, FIG. 7A shows a scanning electron microscope (SEM) image of *B. subtilis* bacterial colonies grown on the uncoated PVDF (control) membrane filter, which is compared against FIG. 7B, which shows a scanning electron microscope (SEM) image of *B. subtilis* bacterial colonies grown on the MXene ($Ti_3C_2T_x$) membrane. It can be clearly seen that bacterial cell density growth on the $Ti_3C_2T_x$, modified membrane is far less when compared to that of the control PVDF membrane. Moreover, the cell colonies consist of intact cell surfaces, whereas the cells grown on the $Ti_3C_2T_x$, MXene membrane were flattened and lost their cellular integrity after exposure to the MXene. Thus, not only do fewer bacterial colonies grow on the MXene membrane surface, but damage is also induced to the bacterial cells following direct contact with the MXene.

Figure 3:
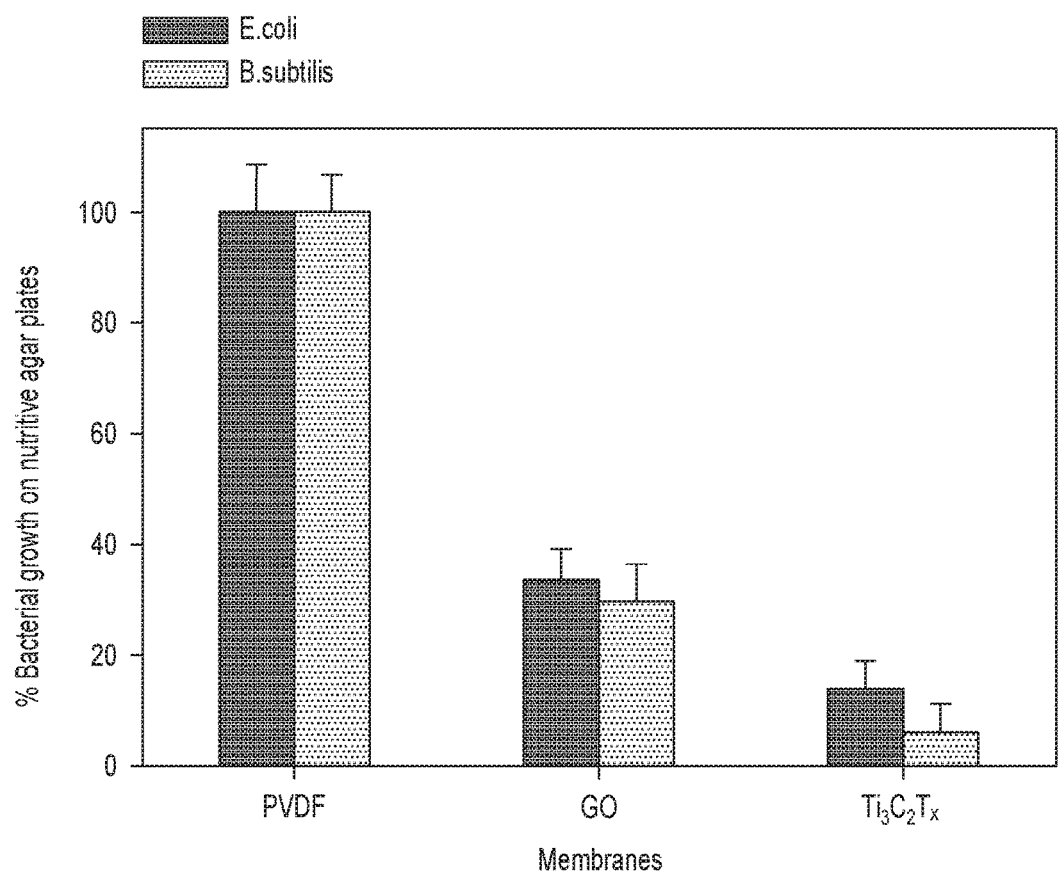
FIG. 3 is a graph showing growth behavior of E. coli and B. subtilis bacteria incubated on uncoated polyvinylidene fluoride (PVDF) control membranes, PVDF membranes modified with a coating of graphene oxide (GO), and PVDF membranes coated with $Ti_3C_2T_x$.

FIG. 3 is a graph showing growth behavior of *E. coli* and *B. subtilis* bacteria incubated on untreated polyvinylidene fluoride (PVDF) membranes, graphene oxide (GO)-modified membranes, and the present $Ti_3C_2T_x$-modified membrane. The results showed that membrane filters modified with $Ti_3C_2T_x$ coatings presented a reduced bacterial growth when compared to GO-modified and unmodified PVDF (control) membrane filters. After 24 hours of incubation at 35° C., control membranes were completely covered by dense *E. coli* and *B. subtilis* bacterial colonies. In contrast, only a limited number of bacterial cell colonies were found on the $Ti_3C_2T_x$ and GO membranes. However, fewer colonies were found on $Ti_3C_2T_x$ membranes compared to the GO membranes, thus showing the superior antibacterial effect of $Ti_3C_2T_x$. In FIG. 3, the data was normalized based on controls. The error bars in FIG. 3 indicate the standard deviation of duplicate measurements.

Figure 8:
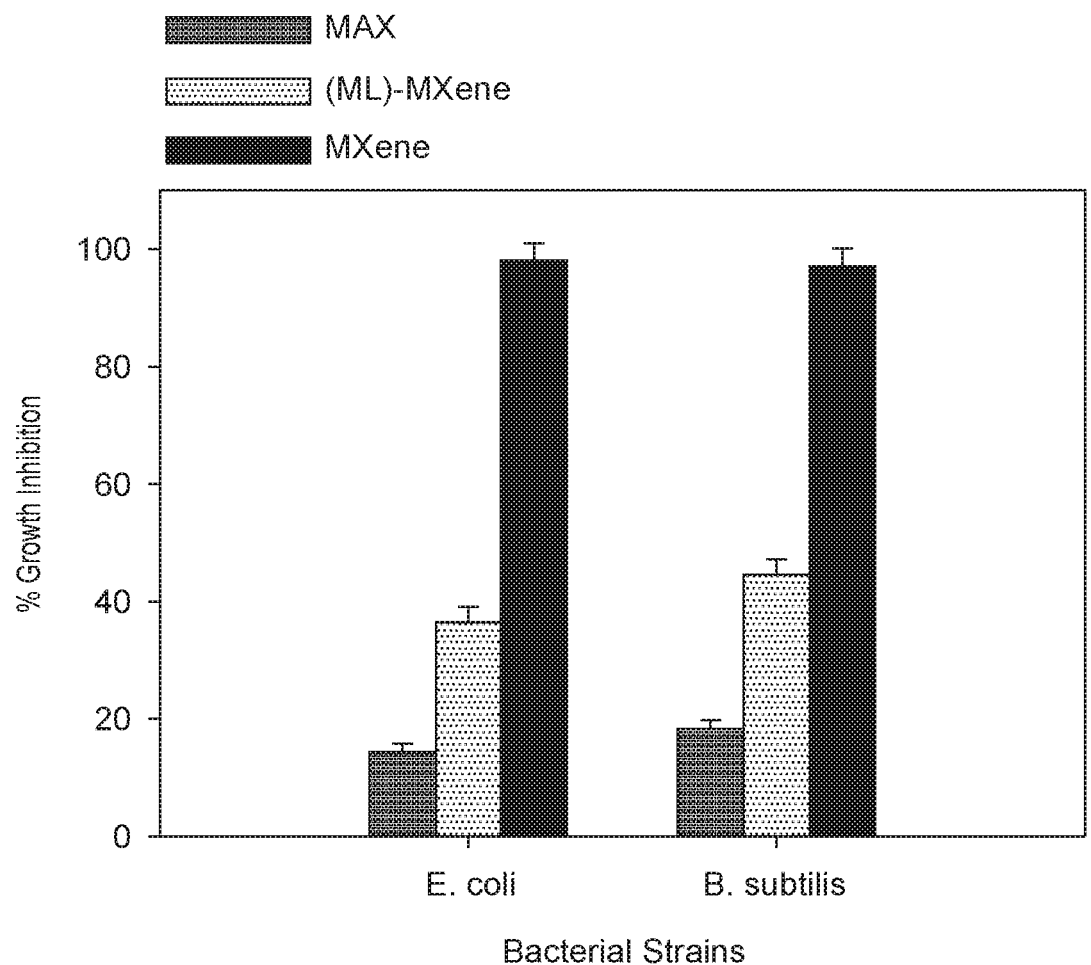
FIG. 8 is a graph comparing growth inhibition of E. coli and B. subtilis bacterial colonies treated with 100 µg/mL of delaminated $Ti_3C_2T_x$ (MXene) nanosheets, multilayered $Ti_3C_2T_x$ MXene ((ML)-MXene), and $Ti_3AlC_2$ (MAX), respectively.

Further, FIG. 8 compares growth inhibition of *E. coli* and *B. subtilis* bacterial colonies, respectively, treated with 100 µg/mL of delaminated $Ti_3C_2T_x$ (MXene) nanosheets, multilayered $Ti_3C_2T_x$ MXene ((ML)-MXene), and $Ti_3AlC_2$ (MAX). MAX dispersion showed growth inhibition of 14.39±1.43% and 18.34±1.59% for *E. coli* and *B. subtilis*, respectively. The (ML)-MXene dispersion showed slightly higher antibacterial activity compared with MAX, with *E. coli* and *B. subtilis* growth inhibition of 30.55±2.56% and 33.60±2.89%, respectively. For the cells exposed to delaminated MXene, the loss of *E. coli* and *B. subtilis* cell viability increased to 97.70±2.87% and 97.04±2.91, respectively, exhibiting much stronger activity. The three forms of material showed significant differences in their antibacterial activities against both bacterial strains. In particular, delaminated MXene has a much more pronounced antibacterial activity compared with those of MAX and (ML)-MXene.

Figure 9A:
FIG. 9A is a scanning electron microscope (SEM) photomicrograph of E. coli bacterial cells cultured in the absence of $Ti_3C_2T_x$, at a scale of 5 µm.
Figure 9B:
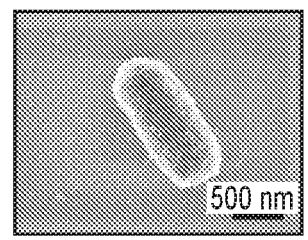
FIG. 9B is a scanning electron microscope (SEM) photomicrograph of E. coli bacterial cells cultured in the absence of $Ti_3C_2T_x$, at a scale of 500 nm.
Figure 10A:
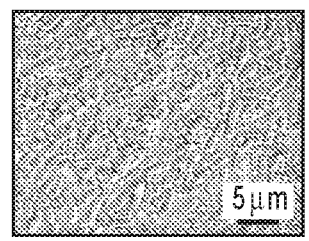
FIG. 10A is a scanning electron microscope (SEM) photomicrograph of B. subtilis bacterial cells cultured in the absence of $Ti_3C_2T_x$, at a scale of 5 µm.
Figure 10B:
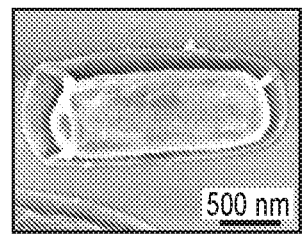
FIG. 10B is a scanning electron microscope (SEM) photomicrograph of B. subtilis bacterial cells cultured in the absence of $Ti_3C_2T_x$, at a scale of 500 nm.

In order to understand the antibacterial effect of MXene, changes of morphology and membrane integrity of *E. coli* and *B. subtilis* cells due to the interaction with MXene were further evaluated by SEM and TEM. FIGS. 9A and 9B are scanning electron microscope (SEM) images of *E. coli* bacterial cells cultured in the absence of $Ti_3C_2T_x$, at low magnification and high magnification, respectively. Similarly, FIGS. 10A and 10B are scanning electron microscope (SEM) images of *B. subtilis* bacterial cells cultured in the absence of $Ti_3C_2T_x$, at low magnification and high magnification, respectively. The bacterial cells for both *E. coli* and *B. subtilis* cultured in the absence of $Ti_3C_2T_x$, were viable with no observed membrane damage or cell death. The higher magnification of FIGS. 9B and 10B shows that the bacteria are protected by intact cytoplasmic membranes.

Figure 9C:
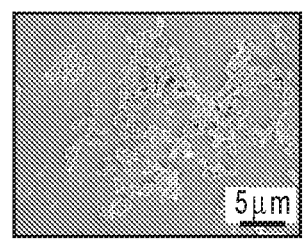
FIG. 9C is a scanning electron microscope (SEM) photomicrograph of E. coli bacterial cells cultured in the presence of 50 µg/mL of $Ti_3C_2T_x$, at a scale of 5 µm.
Figure 9D:
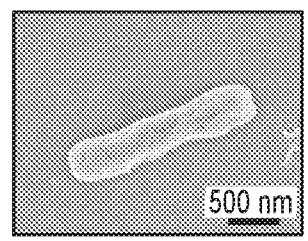
FIG. 9D is a scanning electron microscope (SEM) photomicrograph of E. coli bacterial cells cultured in the presence of 50 µg/mL of $Ti_3C_2T_x$, at a scale of 500 nm.
Figure 9E:
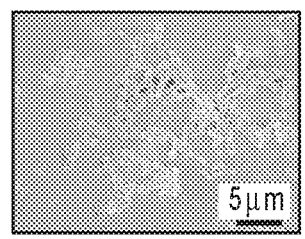
FIG. 9E is a scanning electron microscope (SEM) photomicrograph of E. coli bacterial cells cultured in the presence of 100 µg/mL of $Ti_3C_2T_x$, at a scale of 5 µm.
Figure 9F:
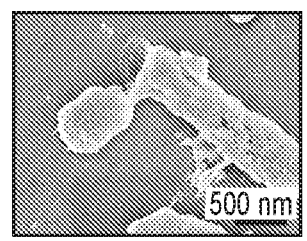
FIG. 9F is a scanning electron microscope (SEM) photomicrograph of E. coli bacterial cells cultured in the presence of 100 µg/mL of $Ti_3C_2T_x$, at a scale of 500 nm.
Figure 10C:
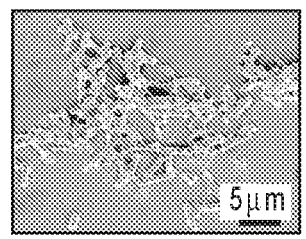
FIG. 10C is a scanning electron microscope (SEM) photomicrograph of *B. subtilis* bacterial cells cultured in the presence of 50 μg/mL of $Ti_3C_2T_x$, at a scale of 5 μm.
Figure 10D:
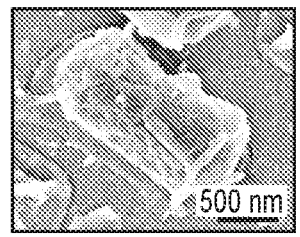
FIG. 10D is a scanning electron microscope (SEM) photomicrograph of *B. subtilis* bacterial cells cultured in the presence of 50 μg/mL of $Ti_3C_2T_x$, at a scale of 500 nm.
Figure 10E:
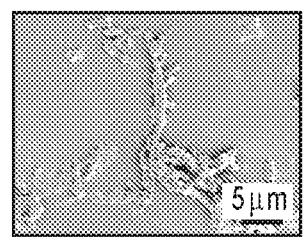
FIG. 10E is a scanning electron microscope (SEM) photomicrograph of *B. subtilis* bacterial cells cultured in the presence of 100 μg/mL of $Ti_3C_2T_x$, at a scale of 5 μm.
Figure 10F:
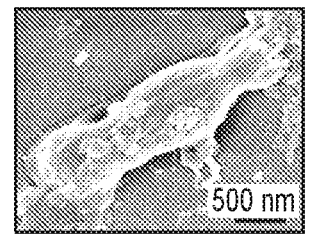
FIG. 10F is a scanning electron microscope (SEM) photomicrograph of *B. subtilis* bacterial cells cultured in the presence of 100 μg/mL of $Ti_3C_2T_x$, at a scale of 500 nm.

FIGS. 9C and 9D are SEM images of *E. coli* bacterial cells cultured in the presence of 50 µg/mL of $Ti_3C_2T_x$, at low magnification and high magnification, respectively. Similarly, FIGS. 10C and 10D are SEM images of *B. subtilis* bacterial cells cultured in the presence of 50 µg/mL of $Ti_3C_2T_x$, at low magnification and high magnification, respectively. Most bacterial cells in the visible field at low magnification suffered from prevalent membrane damage and cytoplasm leakage in the presence of 50 µg/ml of $Ti_3C_2T_x$, which can be clearly observed at the high magnifications. Some bacterial cells still maintained the membrane integrity, but they were deformed. FIGS. 9E and 9F are SEM images of *E. coli* bacterial cells cultured in the presence of 100 µg/mL of $Ti_3C_2T_x$, at low magnification and high magnification, respectively. Similarly, FIGS. 10E and 10F are SEM images of *B. subtilis* bacterial cells cultured in the presence of 100 µg/mL of $Ti_3C_2T_x$, at low magnification and high magnification, respectively. At 100 µg/ml of $Ti_3C_2T_x$, both bacteria suffered from prevalent cell lysis, indicated by a severe membrane disruption and cytoplasm leakage. Significant morphological changes in the cell structure could be attributed to detachment of the cytoplasmic membrane from the cell wall, as confirmed by LDH release assay.

Figure 11A:
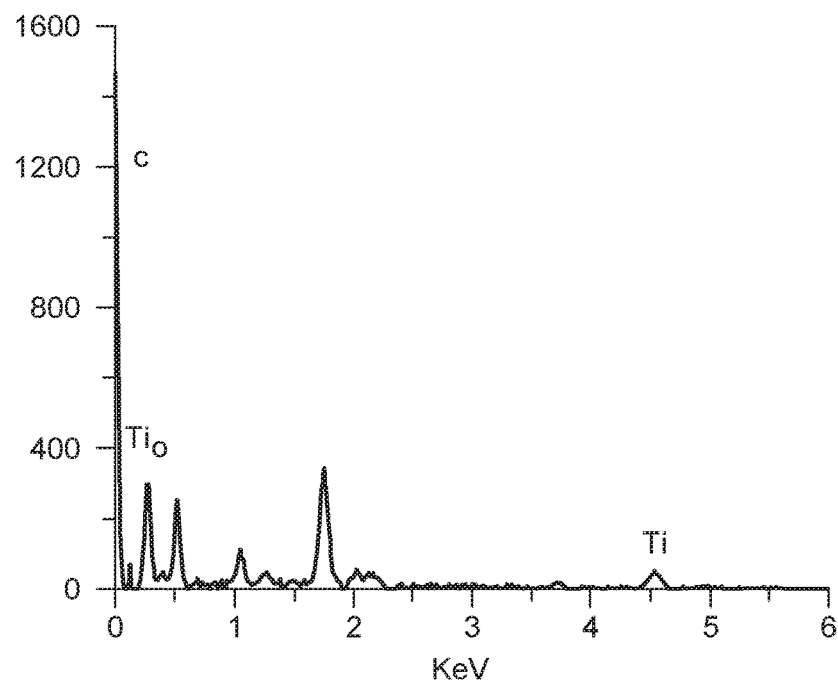
FIG. 11A is an energy dispersive spectroscopy (EDS) spectrum for treated *E. coli* bacteria.
Figure 11B:
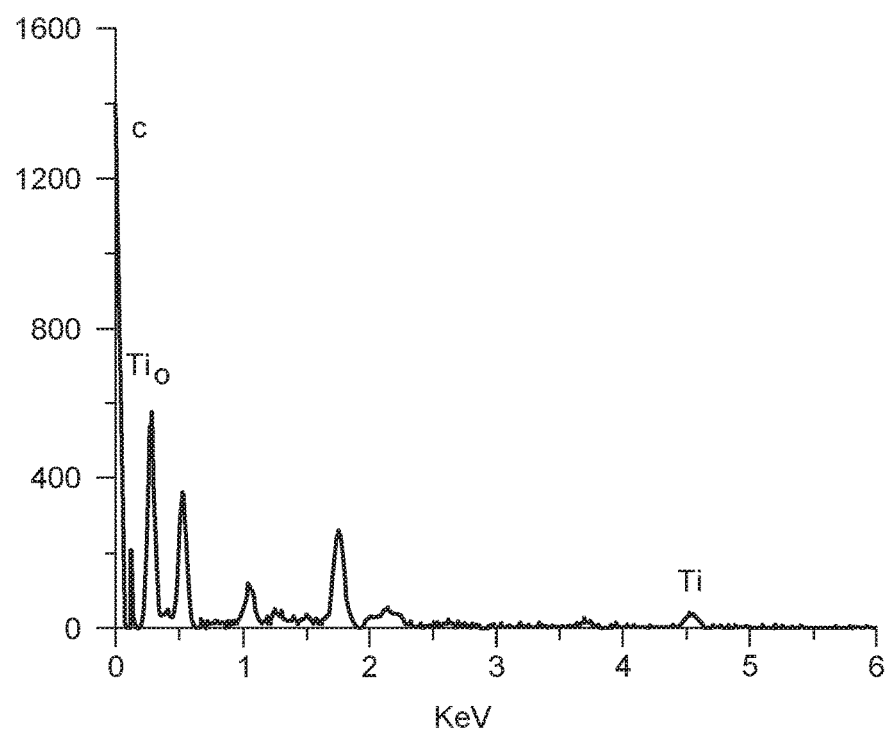
FIG. 11B is an energy dispersive spectroscopy (EDS) spectrum for treated *B. subtilis* bacteria.

As confirmed by the spot energy dispersive spectroscopy (EDS) results for the surface of *E. coli* bacteria and *B. subtilis* bacteria of FIGS. 11A and 11B, respectively, increasing $Ti_3C_2T_x$, concentration causes both *E. coli* and *B. subtilis* to be trapped or wrapped by the thin sheets of $Ti_3C_2T_x$, and subsequently form agglomerates.

Figure 12A:
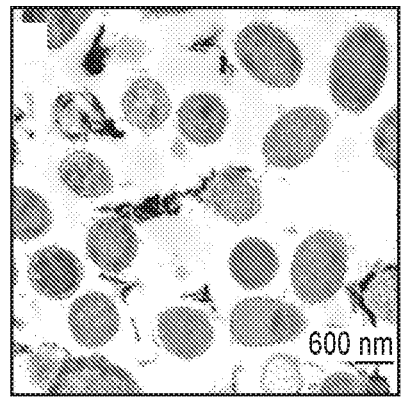
FIG. 12A is a transmission electron microscope (TEM) photomicrograph of *E. coli* bacterial cells treated with 200 μg/mL of $Ti_3C_2T_x$, for 4 hours at low magnification.
Figure 12B:
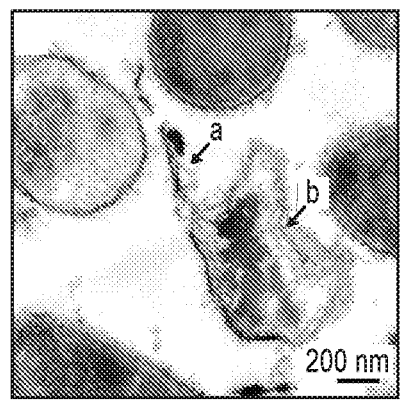
FIG. 12B is a transmission electron microscope (TEM) photomicrograph of *E. coli* bacterial cells treated with 200 μg/mL of $Ti_3C_2T_x$, for 4 hours at high magnification.
Figure 13A:
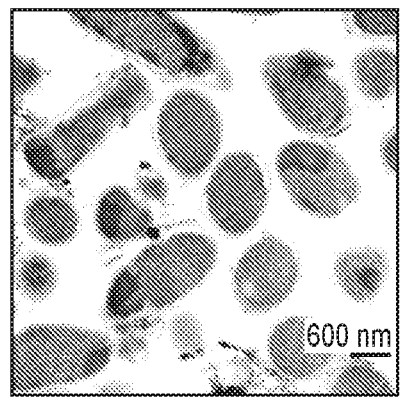
FIG. 13A is a transmission electron microscope (TEM) photomicrograph of *B. subtilis* bacterial cells treated with 200 μg/mL of $Ti_3C_2T_x$, for 4 hours at low magnification.
Figure 13B:
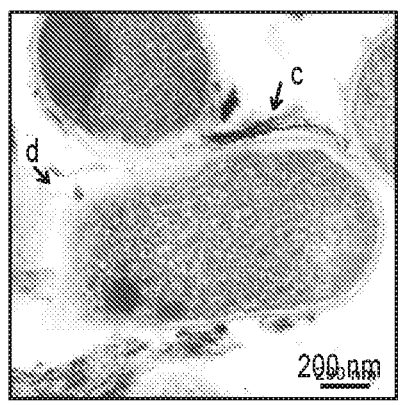
FIG. 13B is a transmission electron microscope (TEM) photomicrograph of *B. subtilis* bacterial cells treated with 200 μg/mL of $Ti_3C_2T_x$, for 4 hours at high magnification.

FIG. 12A is a transmission electron microscope (TEM) image of *E. coli* bacterial cells cultured with 200 µg/ml of $Ti_3C_2T_x$, for 4 hours at low magnification. FIG. 12B is a TEM image of *E. coli* bacterial cells cultured with 200 µg/mL of $Ti_3C_2T_x$, at high magnification. Similarly, FIG. 13A is a TEM image of *B. subtilis* bacterial cells cultured with 200 µg/ml of $Ti_3C_2T_x$, for 4 hours at low magnification, and FIG. 13B is a TEM image of *B. subtilis* bacterial cells cultured with 200 µg/mL of $Ti_3C_2T_x$, at high magnification. One can clearly see the cell wall and membrane damage, as well as the change of the inner structures of the cells. TEM analysis of *E. coli* and *B. subtilis* before and after being exposed to 200 µg/ml of MXene nanosheets shows a decrease in the number of bacterial cells in the MXene treated groups compared to the control. As FIGS. 12B and 13B show, the MXene nanosheets were tightly adsorbed around the cells and even entered into the cells (arrows "a" and "c"). At the same time, the intracellular densities of both *E. coli* and *B. subtilis* decreased, revealing that they lost some intracellular substance. In both *E. coli* and *B. subtilis*, the cell wall was stripped down after exposure to MXene nanosheets (arrows "b" and "d"). Significant inner cell structure leakage can also be observed due to cell wall and membrane damage.

Figure 14A:
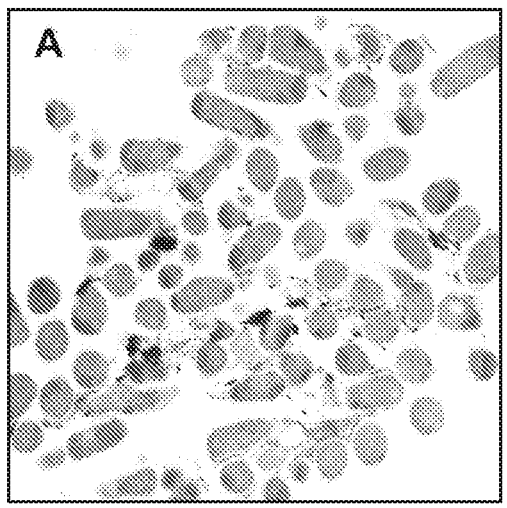
FIG. 14A is a transmission electron microscope (TEM) photomicrograph of *B. subtilis* bacterial cells exposed to 200 μg/mL of $Ti_3C_2T_x$ at 37° C. for four hours at a direct magnification of 10000×.
Figure 14B:
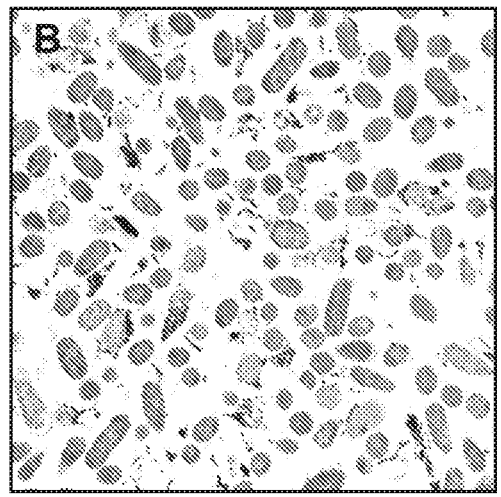
FIG. 14B is a transmission electron microscope (TEM) photomicrograph of *E. coli* bacterial cells exposed to 200 μg/mL of $Ti_3C_2T_x$ at 37° C. for four hours at a direct magnification of 8000×.

FIGS. 14A and 14B are TEM images of *B. subtilis* and *E. coli* bacterial cells, respectively, exposed to 200 µg/mL of $Ti_3C_2T_x$ at 37° C. for four hours. In agreement with the cells viability assay, more *B. subtilis* cells with altered cell morphology were found than with *E. coli*, where cell damage intensity was lower. $Ti_3C_2T_x$ MXene exhibited a higher antibacterial activity towards gram-positive *B. subtilis* as compared to gram-negative *E. coli*. The *E. coli* bacteria, as gram-negative bacteria, are covered by a much thinner layer of peptidoglycan (thickness of 7-8 nm), but have an external protective lipid membrane. Gram-positive *B. subtilis* lacks the external lipid membrane, but its thicker peptidoglycan cell walls are in the range of 20-80 nm. The hydrophilic $Ti_3C_2T_x$ MXene could effectively attach to bacteria, facilitating their inactivation by direct contact interaction.

Figure 15:
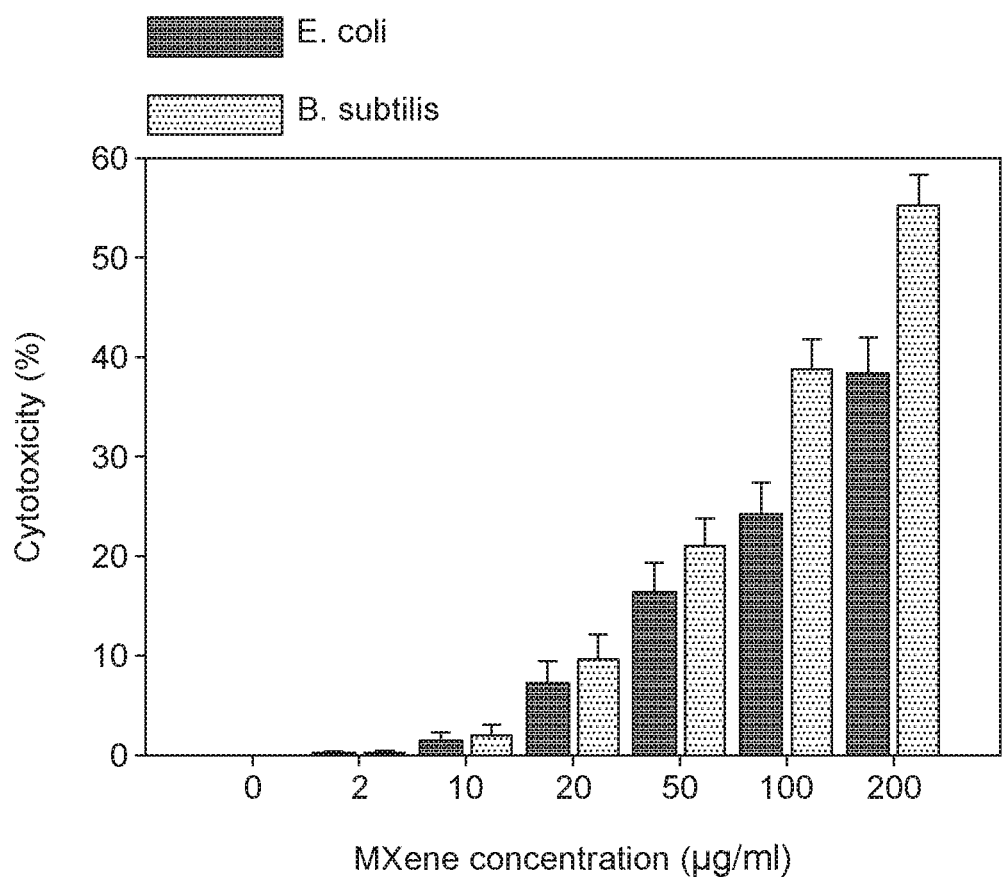
FIG. 15 is a graph showing cytotoxicity in both *E. coli* and *B. subtilis* as a function of concentration of $Ti_3C_2T_x$ MXene as measured by LDH assay of the supernatants after 4 hours of incubation.

FIG. 15 is a graph showing cytotoxicity in both *E. coli* and *B. subtilis* as a function of the concentration of $Ti_3C_2T_x$ MXene. Lactate dehydrogenase (LDH) release assays were used to quantitatively determine the extent of cell damage. FIG. 15 shows the LDH activity in the supernatants after four hours of incubation. Concentration dependent LDH release was observed as bacterial cells were exposed to MXene nanosheet dispersions. The bacterial cells exposed to 2 and 10 µg/L of MXene nanosheets exhibited minimal LDH release for both *E. coli* and *B. subtilis*. However, LDH release increased significantly when bacterial cells were exposed to a 200 µg/L solution of MXene, which showed cytotoxicity of 38.41% and 55.24% for *E. coli* and *B. subtilis*, respectively. This dose dependent cytotoxicity shows that both the walls and the inner contents of the cell were damaged, suggesting that membrane disruption might be a major cell inhibitory mechanism.

Figure 16:
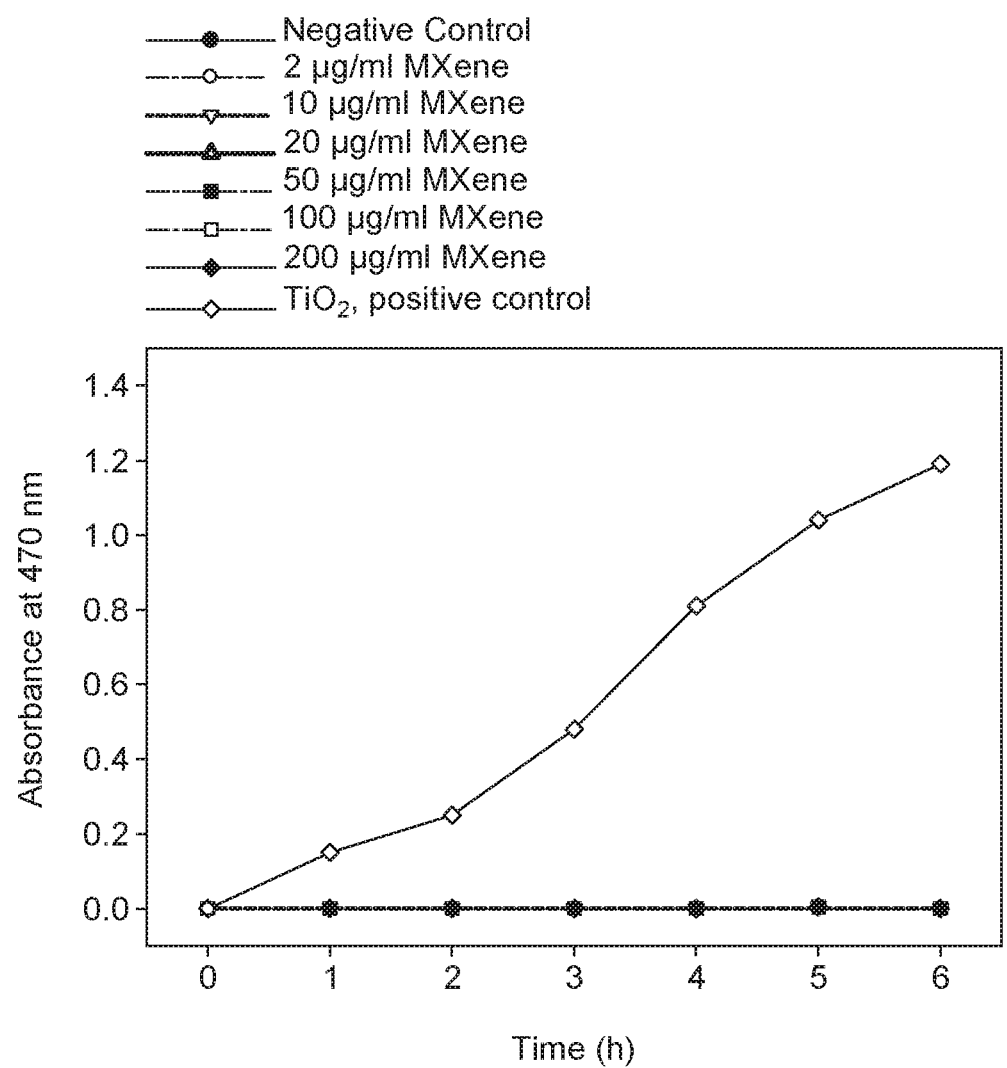
FIG. 16 is a graph showing the change in absorbance at 470 nm as a function of time during an XTT assay of bacterial dispersions treated with $Ti_3C_2T_x$ MXene colloidal solutions at different concentrations for 5 hours at a pH of 7.5 in the dark, with $TiO_2$ (80 μg/mL) used as a control.

Further, the possibility of MXene-induced reactive oxygen species (ROS) dependent and independent oxidative stress was studied in two separate abiotic assays. First, superoxide anion ($O_2.^-$) production at different MXene concentrations was monitored using an XTT assay. As shown in FIG. 16, no noticeable absorption was detected at different MXene concentrations, thus revealing that MXene mediated no or negligible superoxide anion production and their role in MXene antibacterial activity could be minimal. The likelihood of ROS-independent oxidative stress mediated by MXene dispersions was examined using a glutathione oxidation assay. Glutathione is a tripeptide with a thiol group, which serves as one of the major cellular antioxidant enzymes in bacteria. It is involved in intracellular oxidative balance and protects the cells against external electrophilic compounds. The oxidation of glutathione has been widely used as an indicator of the oxidative stress induced by different nanomaterials. Glutathione was exposed to MXene nanosheets at different concentrations in a bicarbonate buffer and incubated for four hours, after which the unoxidized fraction of glutathione was measured spectrophotometrically using Ellman's reaction. Glutathione oxidation was found to be dependent on the MXene concentration.

Figure 17A:
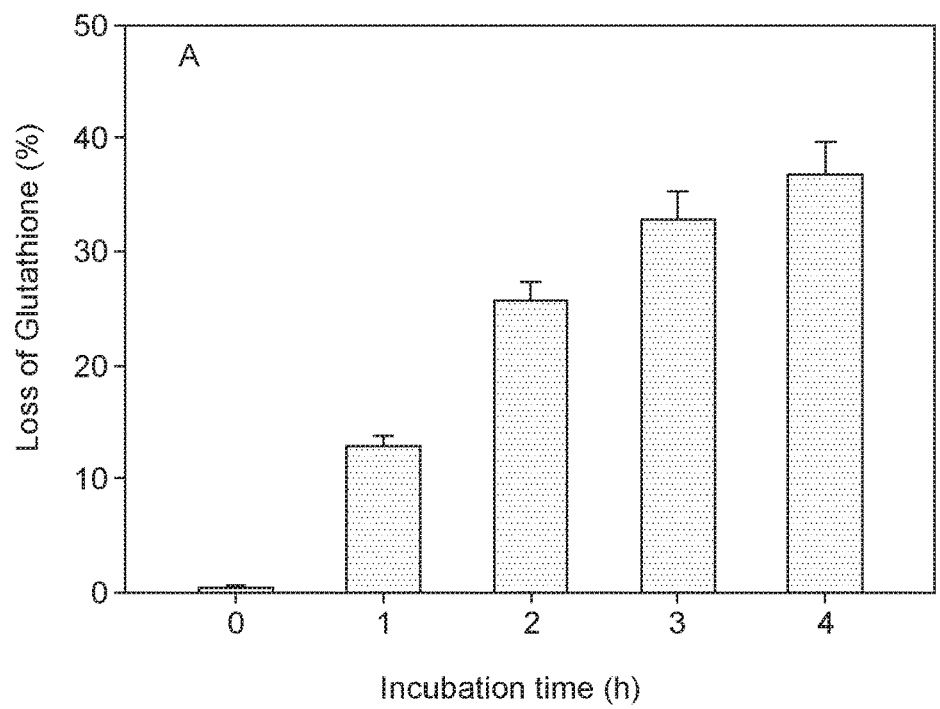
FIG. 17A is a graph showing the results of a glutathione oxidation assay showing oxidation of glutathione in a colloidal suspension of $Ti_3C_2T_x$ MXene at a concentration of 200 μg/ml as a function of incubation time.
Figure 17B:
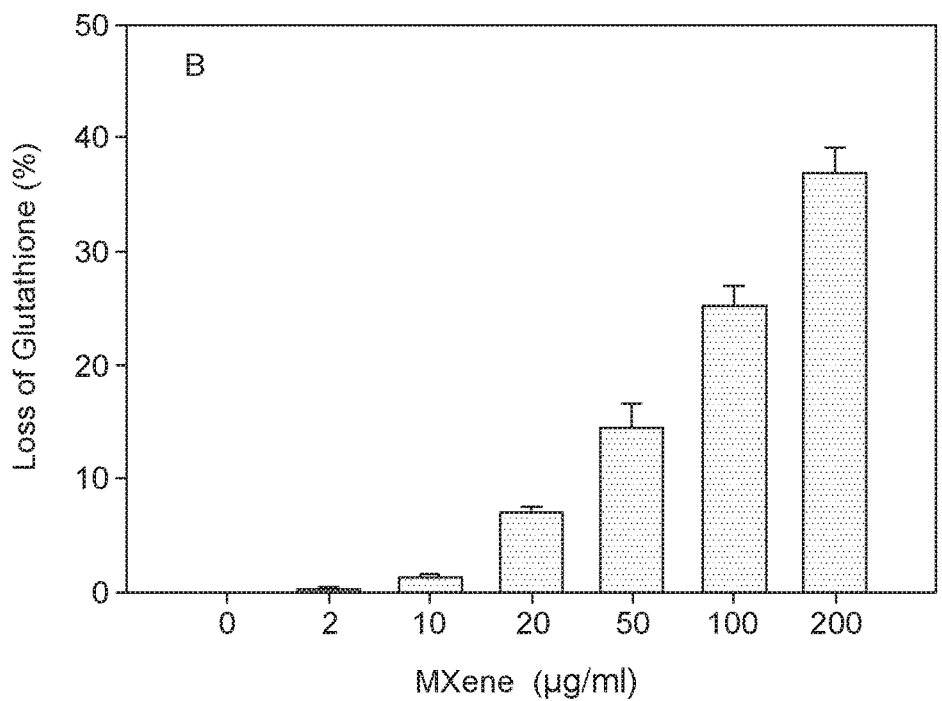
FIG. 17B is a graph showing the results of a glutathione oxidation assay showing oxidation of glutathione in a colloidal suspension of $Ti_3C_2T_x$ MXene as a function of $Ti_3C_2T_x$ MXene concentration.

FIGS. 17A and 17B show that as the MXene concentration in colloidal solution was increased from 2 µg/mL to 200 µg/mL, glutathione oxidation increased from 2.5 to 38.3%. Two possible paths of glutathione oxidation by MXene could be possible: First, oxidation can occur either via direct oxidation of a specific microbial process, or a vital component, as previously shown for fullerenes and CNT. The second mechanism could involve the reduction of surface oxides formed on MXene surface in the presence of oxygen by electron transfer from the glutathione enzymes. Furthermore, the reactive oxygen species ($H_2O_2$ or $O_2^-$) may be released by the $O_2$ molecules adsorbed on the MXene surface, which could later be reduced by the action of glutathione.

The surfaces of MXene sheets suggest O- and F-containing surface terminations, thus giving MXenes negatively charged surfaces. In the case of MXene, its strong antibacterial property can be partially attributed to the anionic nature of the membrane surface. In addition, the antimicrobial activity of MXene can also be due to its high hydrophilicity, which can enhance bacterial contact to the membrane surface, thus resulting in inactivation of adhered microorganisms according to a direct contact-killing mechanism. Moreover, hydrogen bonding between oxygenate groups of MXene and the lipopolysaccharide strings of the cell membrane could result in bactrial inhibition by preventing nutrient intake.

It is to be understood that the present invention is not limited to the embodiments described above, but encompasses any and all embodiments within the scope of the following claims.

We claim:

1. A method of treating water for reduction of bacterial contamination, comprising the steps of:
    providing an antimicrobial agent, the antimicrobial agent comprising MXenes, wherein the MXene is selected from the group consisting of at least one two-dimensional metal carbide layer, carbonitride layer, and nitride layer, the MXenes having the formula $M_{n+1}X_nT_x$, where M is an early transition metal, X is either C or N, n is 1, 2, or 3, T represents a terminal functional group, and x represents the number of terminal functional groups, wherein the terminal functional group comprises at least one functional group selected from the group consisting of O, OH, and F;
    providing a substrate;
    coating the substrate with at least one layer of the antimicrobial agent to form an antimicrobial membrane;
    adding the antimicrobial membrane to the contaminated water to form a colloidal suspension; and
    allowing the colloidal suspension to incubate for a period of time sufficient to reduce levels of bacterial contamination in the water.

2. The method of treating water according to claim 1, wherein said step of adding the antimicrobial membrane further comprises adding the antimicrobial membrane to obtain a concentration of at least 100 µg/ml.

3. The method of treating water according to claim 1, wherein said step of adding the antimicrobial membrane further comprises adding the antimicrobial membrane to obtain a concentration of at least 200 µg/ml.

4. The method of treating water according to claim 1, wherein said step of allowing the colloidal suspension to incubate for a period of time further comprises allowing the colloidal suspension to incubate for about 4 hours.

5. The method of treating water according to claim 1, wherein the XMene is a two-dimensional metal carbide having the formula $Ti_3C_2T_x$.

6. A method of making an antimicrobial membrane, comprising the steps of:
    providing an antimicrobial agent, the antimicrobial agent comprising MXenes, wherein the MXene is selected from the group consisting of at least one two-dimensional metal carbide layer, carbonitride layer, and nitride layer, the MXenes having the formula $M_{n+1}X_nT_x$, where M is an early transition metal, X is either C or N, n is 1, 2, or 3, T represents a terminal functional group, and x represents the number of terminal functional groups, wherein the terminal functional group comprises at least one functional group selected from the group consisting of O, OH, and F;
    providing a substrate; and
    filtering a dilute colloidal solution of the MXenes on the substrate by vacuum filtration to form the membrane.

7. The method of protecting a substrate according to claim 6, wherein said substrate comprises a polymer.

8. The method of protecting a substrate according to claim 6, wherein said substrate comprises a polyvinylidene fluoride (PVDF) membrane support.

9. The method of making the antimicrobial membrane according to claim 6, wherein the XMene is a two-dimensional metal carbide having the formula $Ti_3C_2T_x$.

* * * * *